Patented Jan. 16, 1951

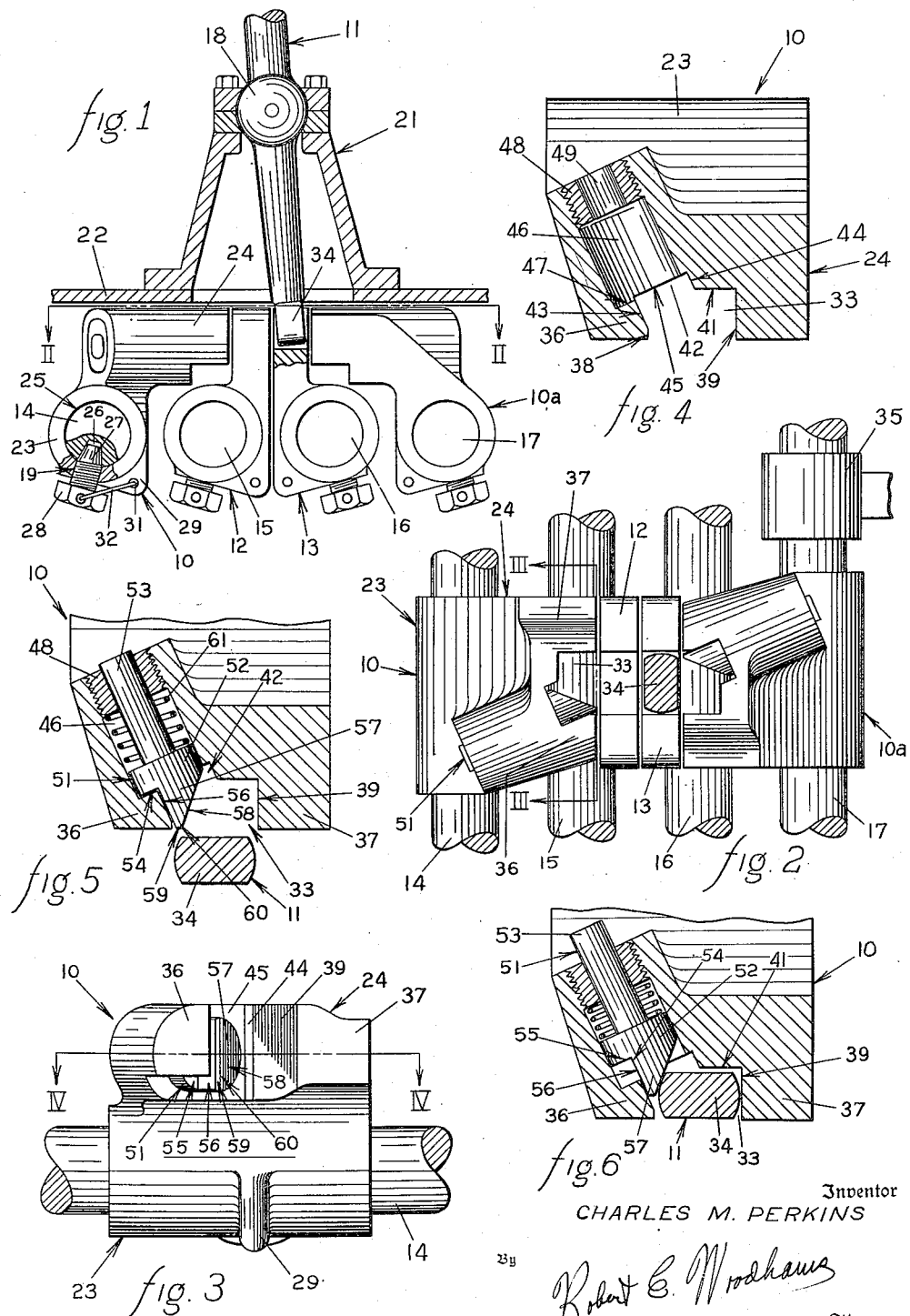

2,538,653

UNITED STATES PATENT OFFICE 2,538,653

GATED SHIFT BLOCK

Charles M. Perkins, Kalamazoo, Mich., assignor to Fuller Manufacturing Company, Kalamazoo, Mich., a corporation of Delaware Application July 18, 1949, Serial No. 105,371

7 Claims. (Cl. 74—473)

This invention relates in general to a shift block, cooperable with the lower end of a shift lever of a transmission, and more particularly to an improved type of shift block having a gate for releasably resisting engagement by said shift lever.

Persons familiar with the use and operation of transmissions, particularly of the heavy type, such as those used in trucks and having three or four shift blocks, are acquainted with the problem of engaging the shift lever with the proper shift block.

Reference is specifically made in this application to a transmission having three or four shift blocks, mountable upon appropriate shift rods, because the problem of engaging a shift lever with the proper shift block does not normally arise where only one or two shift blocks are involved.

Numerous attempts have been made to provide means for positively determining the block being engaged by the shift lever in a transmission having three or four blocks. However, such attempts have never been completely satisfactory for one or more of numerous reasons. For example, resilient means of various types have been provided in the said third and fourth, or outside, blocks in a heavy transmission to prevent accidental engagement between said outside blocks and the shift lever. However, such resilient means have, as far as I know, been so constructed that the operator of the transmission must exert continuous positive pressure to hold the shift lever in engagement with such a block throughout a shifting operation involving said outside block. Furthermore, the amount of pressure required to place the lever in engagement with an outside block having such presently known resilient means increases substantially as the lever approaches a fully seated position within the block. If continuous positive pressure is not maintained upon the lever, the said resilient means either rejects the shift lever from the block or causes it to scrape against an adjacent block and thereby damage the side of the shift lever. In addition to damaging the lever, the pressure produced by said resilient means also imposes an undesirable sidewise pressure upon said adjacent block which ultimately results in the necessity of replacing the shift lever and/or said adjacent block.

I have conceived a shift block having a gate cooperably engageable by the lower end of a shift lever and having means positively resisting engagement between said block and said shift lever, which resistance means, when initially over-powered, becomes sufficiently negligible that continued engagement between said shift lever and said block can be maintained with little or no perceptible effort on the part of the person operating the lever.

Accordingly, a primary object of this invention is the provision of an improved shift gate for a heavy, truck type transmission having a shift lever and three or four shift blocks whereby engagement between the lower end of the shift lever and the proper shift block can be easily and positively determined and further whereby such engagement can be easily accomplished and maintained.

A further object of this invention is the provision of an improved shift gate having means for positively, but releasably, resisting engagement thereof by the lower end of a shift lever of a transmission, particularly of the heavy, truck type having three or four shift blocks.

A further object of this invention is the provision of a shift gate, as aforesaid, having means for positively resisting engagement of a shift block by a shift lever which resistance means, when initially overcome, becomes negligible whereby continued engagement between said block and said lever can be maintained with little or no perceptible effort.

A further object of this invention is the provision of a shift block, as aforesaid, having means resisting engagement by a shift lever, which means will tend to reject said lever from engagement with said shift block but is constructed so that said rejection force is barely noticeable to a person operating the shift lever and is so moderate that it will not cause damage either to the lever or to the adjacent shift block when manual engagement of the shift lever is released while the transmission is in gear.

Other objects and purposes of this invention will become apparent to persons familiar with this type of equipment upon referring to the accompanying drawing and upon reading the following specification.

In meeting those objects and purposes heretofore mentioned, as well as others incidental thereto and associated therewith, I have provided a shift gate, particularly for use with a heavy transmission having three or four blocks and particularly designed for use with an outside block. My gated block is comprised of a body portion having a cylindrical opening therethrough for securement upon an appropriate cylindrical shift rod. My gated block is further provided with a lever engaging portion integral with said body portion and extending upwardly and sidewardly therefrom. Said lever engaging portion is provided with a rectangular slot into which the lower end of a shift lever is admissible. A plunger is resiliently retained within an appropriate opening in said lever engaging portion so that it extends partially into said slot along one side thereof, the axis of said plunger preferably being disposed at an angle to the said side of said slot. That side of said plunger extending into the said slot is provided with a planar surface spaced from and disposed at a slight divergent angle to the opposing side of said slot. Thus, as the lever enters the slot in said gated block, it first engages the outer end of the plunger and then engages the said planar surface thereof.

For illustrations of a preferred embodiment of the invention, reference is made to the accompanying drawings in which:

Figure 1 is a fragmentary, broken, centrally cross-sectioned view of a heavy gear transmission showing a pair of said gated shift blocks, to which this invention relates, aligned with and on opposite sides of a pair of intermediate, conventional shift blocks.

Figure 2 is a sectional view taken along the line II—II of Figure 1.

Figure 3 is a front elevation view of my improved shift block as viewed along the line III—III of Figure 2.

Figure 4 is a sectional view taken along the line IV—IV of Figure 3 and omitting the plunger and plunger spring.

Figure 5 is a fragmentary, sectional view substantially as taken along the line IV—IV of Figure 3, and includes the lower end of a shift lever, the plunger and the plunger spring.

Figure 6 is a fragmentary, sectional view of Figure 3, similar to that shown in Figure 5, except that the block is engaged by the shift lever.

*Construction*

As shown in Figures 1 and 2 of the accompanying drawings my improved gated shift block 10 is preferably, but not necessarily, used in a heavy gear transmission requiring three or four shift blocks and having an appropriate number of gear shift positions wherein the problem of engaging the proper shift block by the shift lever 11 is involved. The gated shift blocks 10 and 10a, which are preferably identical, are outboard of and on opposite sides of a pair of conventional inner shift blocks 12 and 13. The outer and inner shift blocks, 10, 12, 13 and 10a are mounted upon and secured to conventional shift rods 14, 15, 16 and 17, respectively, as hereinafter described in detail. The shift lever 11 is provided with an integral pivot ball 18, intermediate its upper and lower extremities, which pivot ball is pivotally supported within the transmission tower 21 upon the transmission cover 22 in a conventional manner.

For purposes of convenience in description, the terms "inwardly" and "outwardly," as used in this specification, shall be understood to have reference to the geometric center of the transmission and/or parts thereof. The terms "upper" or "upwardly" and "lower" or "downwardly" shall be understood to refer to the transmission when positioned and/or operating in its normal manner of use.

The following description of my improved shift block, although specifically directed to the gated shift block 10 (Figures 1 and 2), shall be intended to apply to the gated shift block 10a as well.

The gated shift block 10 (Figures 1, 2, 3 and 4) is comprised of a body portion 23 and a lever engaging portion 24 which are preferably integral. The body portion 23 is provided with a cylindrical shift rod opening 25 by means of which the block 10 may be sleeved upon the shift rod 14. The body portion 23 is provided with a threaded set screw opening 19 communicating with the rod opening 25 for cooperation with a set screw 28 having a tapered end 27. The rod 14 is provided with a tapered opening 26 for snug reception of the tapered end 27 therewithin, whereby the shift block 10 may be securely affixed upon the shift rod 14 to prevent any movement between the shift block and the shift rod. The shift rods 14, 15, 16 and 17 may be mounted for axially reciprocable movement upon conventional means, not shown, in a conventional manner.

A lock boss 29 (Figure 1), preferably integral with the block body portion 23, is provided thereon adjacent to the set screw 28 and has a safety wire opening 31 through which safety wire 32 may be threaded for engagement with an appropriate opening in the head of the set screw 28 in a conventional manner.

The gated shift block 10 is normally affixed to the shift rod 14 so that the lever engaging portion 24 thereof is substantially above and slightly offset inwardly with respect to the shift rod 14, and is preferably provided with a rectangular lever slot 33 (Figures 2 and 4) on that side thereof adjacent to one of the inner shift blocks, here the inner shift block 12. The lever slot 33 is preferably disposed so that it is aligned with similar slots in the inner shift blocks 12 and 13 when said shift blocks are all in the neutral position. Said lever slot is further disposed so that it is engageable by the lower end 34 of the shift lever 11 when said shift blocks are all in the neutral position.

For the purposes of this invention, it will be assumed that the expression "neutral position" carries the conventional meaning that no power can be transmitted by the transmission and all of the lever slots are aligned as appearing in Figure 2.

Shift yokes, such as the shift yoke 35 (Figure 2), of any conventional type may be secured to the shift rods 14, 15, 16 and 17 in a conventional manner or may be integral with the shift blocks 10, 12, 13 and 10a, as desired or required according to conventional practice.

The lever slot 33 (Figures 2, 3 and 4) creates a pair of bosses or fingers 36 and 37 in the lever engaging portion 24 on either side of the lever slot 33, the outer ends of said fingers preferably lying substantially within a single plane, which plane is spaced a short distance from the adjacent side of the inner shift block 12. The lever slot 33 has a pair of substantially parallel sidewalls 38 and 39, preferably perpendicular to the shift rod 14, and an end wall 41 which is preferably, but not necessarily, substantially perpendicular to the sidewalls 38 and 39. The sidewalls 38 and 39 are preferably spaced from each other for substantially snug reception of the lower end 34 of the shift lever 11 therebetween.

A rectangular plunger slot 42 having sidewalls 43 and 44 and an end wall 45, which is preferably substantially perpendicular to the sidewalls 43 and 44, is provided in one inner corner of the lever slot 33, here the corner at which the plane of the end wall 41 and the plane of the sidewall 38 meet. The plunger slot end wall 45 is preferably disposed at an angle of approximately 30 degrees to the end wall 41 of the lever slot 33.

A cylindrical plunger opening 46 (Figures 4, 5 and 6), which is provided in the lever engaging portion 24 of the shift block 10, extends into the finger 36 and communicates with the plunger slot 42. The axis of the plunger opening 46 is preferably perpendicular to the plunger slot end wall 45. The end adjacent to the plunger slot 42, being somewhat larger in diameter than the distance between the sidewalls 43 and 44 of the plunger slot 42, blinds within the finger 36 to form a plunger stop wall 47 advantageously parallel with the plunger slot end wall 45. The opposite end of the plunger opening 46, remote from the stop wall 47, opens completely out of the lever engaging portion 24 and is internally threaded a short distance inwardly for threaded engagement by an appropriate externally threaded plug 48. The plug 48 is provided with a coaxial bearing opening 49 therethrough.

A plunger 51 (Figures 5 and 6), having a head 52 and a coaxial, cylindrical stem 53, is positioned within the plunger opening 46 so that the stem 53 extends through the bearing opening 49 in the plug 48. The plunger head 52 is provided with a right angular notch 54 in that end thereof remote from the plunger stem 53. The plunger head notch 54 is comprised of a stop surface 55 substantially perpendicular to the longitudinal axis of the plunger 51, and a planar guide surface 56 intercepting and substantially perpendicular to said stop surface 55. When the plunger 51 is in operating position, the stop surface 55 bears against the plunger stop wall 47, at the inner end of the plunger opening 46, and the guide surface 56 slidably engages the plunger slot wall 43.

The extended portion 57 of the plunger head 52 (Figures 5 and 6), which is adjacent to the notch 54, extends through the plunger slot 42 into the lever slot 33, and is provided with a flat, vertical lever surface 58 which is divergent with respect to the opposing sidewall 44 of the lever slot 33 away from the end wall 41 at an angle of approximately 15 degrees. The plunger head 52 has an outer end 59 extending between the guide surface 56 of the plunger head notch 54 and the lever surface 58, which preferably lies substantially within the aforementioned plane defined by the outer free ends of the fingers 36 and 37, when the stop surface 55 is bearing against the plunger stop wall 47. The vertical edge 60, defined by the intersection of the lever surface 58 and the head outer end 59, is rounded slightly to facilitate entry of the lever lower end 34 between the lever surface 58 and the sidewall 39 of the lever slot 33.

A plunger spring 61 (Figures 5 and 6) is sleeved upon the plunger stem 53 and held under compression between the plug 48 and the plunger head 52 thereby causing the stop surface 55 of the notch 54 normally to bear against the plunger stop wall 47 within the finger 36. The guide surface 56, slidably engaging the plunger slot sidewall 43, prevents rotation of the plunger 51 within the plunger opening 46 thereby maintaining the vertical position of the lever surface 58. The plunger head 52 is of sufficient axial length to be in continuous contact with the inner surface of the plunger opening 46 wherein it is snugly held for reciprocal movement.

It will be seen (Figure 6) that depression of the plunger head 52 into the plunger opening 46, thereby compressing the spring 61, will cause the lever surface 58 to recede away from the opposing sidewall 39 of the lever slot 33. As shown hereinafter, the exact angular relationship between the lever surface 58 and the lever slot sidewall 39 may vary somewhat from the abovementioned 15 degrees depending upon the desired and required conditions. However, it will become apparent that the lever surface 58 and lever slot sidewall 39 must diverge outwardly slightly to permit unimpaired disengagement of the lever from the gate.

*Operation*

When the gated block 10 has been mounted upon an appropriate shift rod 14, as hereinabove described, it is ready for immediate use. As shown in Figure 5, engagement between the gated shift block 10 and the shift lever 11 is accomplished by urging the lever lower end 34 against the outer end 59 of the plunger head 52 in a direction perpendicular to the end wall 41 of the lever slot 33, thereby causing the lever surface 58 to recede from the lever slot sidewall 39 until the lever lower end 34 is permitted to pass between the said lever surface 58 and lever slot sidewall 39. It has been found that this initial depression of the plunger head 52 is best accomplished by an abrupt movement of the shift lever.

When the lower end 34 of the shift lever 11 has passed around the rounded edge 60, between the lever surface 58 and the outer end 59 of the head 52, continued movement of the lower end 34 into the lever slot 33 requires very little or no appreciable effort. The rounded edge 60 on the head 52 also prevents scoring of the lever lower end 34. The lever surface 58 of the plunger head 52 becomes in effect an inclined plane with respect to the movement of the lever lower end 34, whereby a substantial mechanical advantage is obtained during the remaining depression of the plunger head 52 until the engagement of the lever lower end 34 with the shift block 10 is completed.

A negligible amount of pressure is required to maintain engagement between the block 10 and the lever lower end 34 after such engagement has been accomplished and during shifting operation. However, when the shift lever 11 is manually released, the plunger spring 61, acting through the plunger head 52 and the inclined lever surface 58, ejects the lever lower end 34 from the lever slot 33 in the block 10. This ejecting action is very mild and is in no way comparable to the severe snapping action created by presently used resilient means.

Although the above mentioned drawings and description apply to one particular, preferred embodiment of the invention, it is not my intention, implied or otherwise, to eliminate other variations or modifications which do not depart from the scope of the invention unless specifically stated to the contrary in hereinafter appended claims.

I claim:

1. In a gated shift block mountable upon a shift rod of a gear transmission having a shift lever pivotally supported upon the transmission intermediate its upper and lower ends, the combination comprising: a lever engaging portion having a pair of spaced fingers extending substantially equidistantly therefrom in a direction substantially perpendicular to the axis of said shift rod, said fingers and lever portion defining a lever slot having a pair of parallel sidewalls, between which said lever lower end is snugly receivable, and an end wall; an axially reciprocable, resiliently backed plunger mounted within said lever portion and one of said fingers and extending into the lever slot through one of said sidewalls and the end wall, the axis of the plunger being convergent with the plane of the other sidewall in a direction away from the end wall at an angle of about thirty degrees, and said plunger having a rounded end surface alignable with the extended ends of said fingers and adjacent to said one sidewall for normally and yieldably obstructing entry of the lever lower end into the lever slot, and said plunger having a flat face merging with said rounded surface and being opposed to and divergent with said other sidewall in a direction away from the end wall at an angle of from about five to fifteen degrees, the lower end of the lever being admissible between the other sidewall and the flat face when the plunger is slightly depressed; and means limiting the extent of the plunger into the lever slot.

2. In a gated shift block mountable upon a shift rod of a gear transmission having a shift lever, the combination comprising: a pair of spaced, substantially coextensive fingers defining a slot having sidewalls substantially perpendicular to the axis of the shift rod and an end wall therebetween, the lever being admissible between the sidewalls; an axially reciprocable, resiliently backed plunger extending into the slot through one sidewall and the end wall, the axis of the plunger being convergent with the plane of the other sidewall in a direction away from the end wall at an acute angle and said plunger having an end surface alignable with the extended ends of said fingers for yieldably obstructing entry of the lever into the slot and having a face merging with said end surface opposite to and divergent with said other sidewall in a direction away from said end wall at an acute angle, the lever being engageable by said plunger face; and means limiting the extent of the plunger into the slot.

3. In a gated shift block mountable upon a shift rod of a gear transmission for cooperation with a shift lever, the combination comprising: means defining a slot in the shift block for reception of the shift lever; a resiliently backed plunger protruding angularly into said slot from a rearward corner thereof and having a rounded end lying adjacent to the open end of said slot and a beveled surface merging with said rounded end, said beveled surface being positioned divergently with respect to an opposed face of said slot in a direction outwardly of said slot; means defining an opening in said block accommodating said plunger and limiting the extent of its protrusion into said slot; whereby said shift lever, upon entering said slot, first encounters said rounded end and when said plunger is slightly depressed, by causing said lever to exert an appreciable pressure thereagainst, then encounters said beveled portion which requires substantially less pressure thereagainst to continue the lever's entry into said slot.

4. In a gated shift block mountable upon a shift rod of a gear transmission for cooperation with a shift lever, the combination comprising: means defining a slot in the shift block for reception of the shift lever; a resiliently backed plunger protruding angularly into said slot from a rearward corner thereof and having a first surface disposed at one angle to the centerline of said slot and yieldably obstructing entry of said lever into said slot, and having a second surface merging with said first surface and disposed at an angle thereto, said second surface being engageable by said lever when said plunger is slightly depressed by causing said lever to exert an appreciable pressure against the first surface, and said second surface being at such an angle to the centerline of said slot that continued depression of said plunger by engagement of the lever and the second surface requires substantially less pressure than the first mentioned pressure; and means defining an opening in said block accommodating said plunger and limiting the extent of its protrusion into said slot.

5. In a gated shift block mountable upon a shift rod of a gear transmission and having a slot engageable by the shift lever of said transmission, the improvement comprising: a resiliently backed plunger protruding angularly into said slot from an inner corner thereof and having means effecting an initial, yieldable resistance to the admission of said lever within said slot, said initial resistance terminating after said lever reaches a predeterminable point within the slot, and having further means effecting a resistance to continued admission of the lever into the slot, said last named resistance being substantially less than the initial resistance and taking effect after the termination thereof.

6. In a gated shift block mountable upon a shift rod of a gear transmission and engageable by the lower end of a shift lever, the combination comprising: a lever engaging member having a side with a lever slot therein, said slot having a pair of parallel sidewalls, between which said lever lower end is snugly receivable, and an end wall, said member also having an opening therein communicating with said slot at the junction of one sidewall and said end wall, the center line of said opening diverging with respect to said one sidewall in a direction away from said end wall at an acute angle; an axially reciprocable, resiliently backed plunger disposed within said opening and extending into said slot, said plunger having an end surface substantially alignable with said side of said member and adjacent to said one sidewall for yieldably obstructing entry of the lever lower end into the slot, and said plunger having a side surface merging with said end surface opposed to and diverging from the other sidewall in a direction away from the end wall at an angle of from about five to about fifteen degrees, the side surface being engageable by the lever lower end when the plunger is partially depressed; and means limiting the extent of the plunger into the lever slot.

7. In a gated shift block mountable upon a shift rod of a gear transmission and engageable by the lower end of a shift lever, the combination comprising: a lever engaging member having a side with a lever slot therein, said slot having a pair of parallel sidewalls, between which said lever lower end is snugly receivable, and an end wall, said member also having an opening therein communicating with said slot through one sidewall, the centerline of said opening being divergent with respect to said one sidewall in a direction away from the end wall at an acute angle; an axially reciprocable, resiliently backed plunger disposed within said opening and extending into said slot, said plunger having an end surface substantially parallel with said end wall and adjacent to said one sidewall for yieldably obstructing entry of the lever lower end into the slot, and said plunger having a side surface merging with said end surface opposed to and diverging from the other sidewall in a direction away from the end wall at an acute angle, the side surface being engageable by the lever lower end when the plunger is slightly depressed; and means preventing extension of the plunger beyond said side of said member.

CHARLES M. PERKINS.

REFERENCES CITED

The following references are of record in the file of this patent:

UNITED STATES PATENTS

| Number | Name | Date |
|---|---|---|
| 1,881,843 | Morley | Oct. 11, 1932 |

FOREIGN PATENTS

| Number | Country | Date |
|---|---|---|
| 373,822 | Germany | Apr. 16, 1923 |
| 527,202 | France | Oct. 22, 1921 |